Aug. 16, 1966
A. SILVERSTEIN
3,267,419
AUTOMATIC INSTRUMENTED DIVING ASSEMBLY
Original Filed May 31, 1962
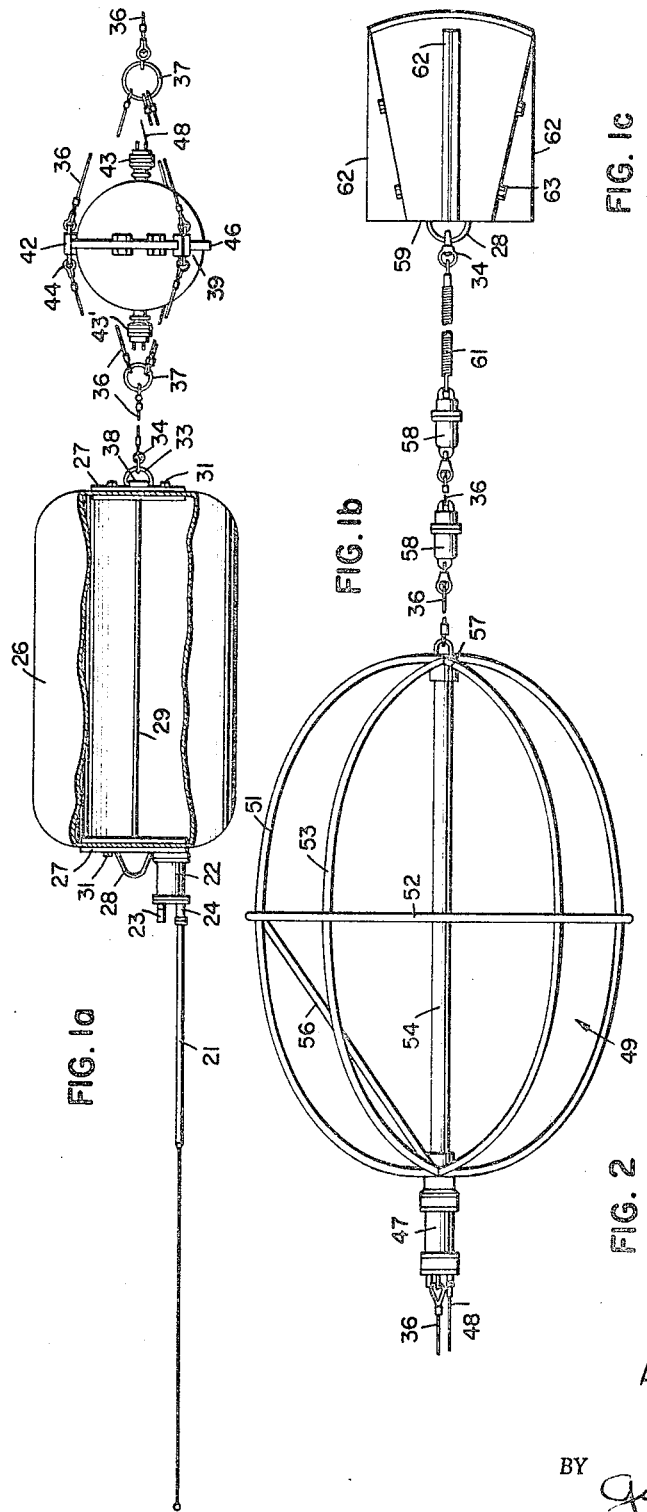
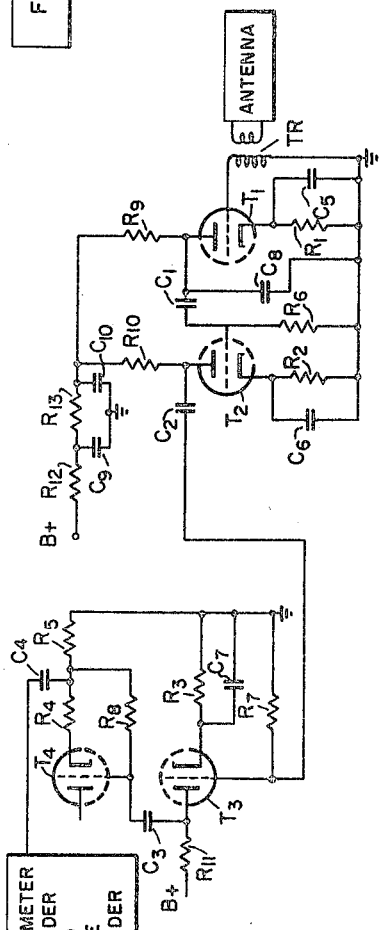
INVENTOR
ABRAHAM SILVERSTEIN
BY George J. Rubens
ATTORNEY 3,267,419
AUTOMATIC INSTRUMENTED DIVING ASSEMBLY
Abraham Silverstein, Hyattsville, Md., assignor to the United States of America as represented by the Secretary of the Navy
Original application May 31, 1962, Ser. No. 199,197. Divided and this application May 12, 1965, Ser. No. 463,066
2 Claims. (Cl. 340—4)

The invention described herein may be manufactured and used by or for the Government of the United States of America without any royalties thereon or therefor.

This application is a division of application Ser. No. 199,197, filed May 31, 1962.

The present invention relates to water exploration and more particularly to an instrumented diving assembly capable of submerging to the bottom of the ocean in the deepest portion and obtaining scientific data as to the temperature, pressure, electromagnetic radiation, nuclear radiation and any other physical phenomena capable of being recorded, and after a predetermined period of time the assembly is released and rises to the surface for recovery and subsequent evaluation of the data obtained.

In the field of underwater exploration, it has been the general practice to employ instrumented diving assemblies which are capable of being submerged several thousand feet into the ocean and of obtaining the data required. These assemblies generally have been connected to a ship or a floating vessel by means of a cable and due to the underwater currents they were not able to reach the very bottom of the deepest ocean without breaking the cable since the ocean is seven miles deep. A further limitation is that these assemblies have not be able to withstand the great pressure, up to 20,000 lbs. p.s.i., which are found at the bottom of the ocean.

In recent years the bathyscaphe, developed as a deep sea assembly, is capable of carrying both men and instruments into the deep portions of the ocean. One major disadvantage present in the bathyscaphe is the equipment necessary for submerging and subsequently surfacing the vessel created large magnetic fields which hindered the obtaining of data concerning the electromagnetic radiations present since the magnetic field produced by ballast solenoids in the bathyscaphe were greater than those fields present in the underwater regions due to natural phenomena.

Although the prior are devices worked well for their intended purpose they were unable to obtain data concerning the ocean bottom. The ocean bottom has remained unexplored and one of the possibilities of its use is in the field of communication. In order to use the ocean bottom for communication it is necessary to determine the noise level and electromagnetic radiation which is present in order to determine the requirements of a system which is capable of transmitting along the ocean bottom. The general purpose of this invention is to provide a deep sea exploration apparatus which is capable of submerging itself to the deepest portion of the ocean, withstand the high pressures there present, obtain the desired physical data, record the data obtained, surface after a predetermined time, and initiate the transmission of a coded signal upon surfacing so that the assembly may be detected and subsequently recovered.

An object of the present invention is to provide a new and improved system for detecting and recording the physical phenomena present at the bottom of the ocean.

Another object of the present invention is to provide a new and improved deep sea assembly which is capable of withstanding very high pressures.

A still further object of the present invention is to provide a new and improved deep diving assembly which is unmanned and is capable of submerging itself to the bottom of the ocean and after a predetermined time of resurfacing.

Another object of the present invention is to provide a new and improved antenna system which is capable of detecting electromagnetic radiations from any direction wherein the eddy currents have a reduced effect on the data acquired.

Other objects and advantages of the invention not at this time enumerated will become apparent as the nature of the invention is better understood by reference to the following detailed description when considered in connection with the accompanying drawings in which like reference numerals designate like parts thoughout the figures thereof and wherein:

FIGS. 1A and 1B arranged as shown in FIG. 1C, form a schematic view of the assembly and illustrate a preferred embodiment of the invention; and FIG. 2 is a schematic diagram of the typical circuitry suitable for recording the electromagnetic radiations of the antenna onto suitable recording means.

Referring now to the drawings:

FIG. 1A is a view of some of the various assemblies connected together to form an operative embodiment of the invention. The whip antenna 21 is shown connected to transmitter housing 22 by means of the whip antenna mounting 24. Mounted on top of the transmitter housing 22 is a transmitter off-on switch 23. The transmitter off-on switch 23, described more fully in connection with FIG. 2, is so constructed as to turn the transmitter off when the switch 23 is below the sea water and to turn the transmitter on when the assembly is floating on the surface of the sea. The transmitter mounted in the transmitter housing 22 is of standard commercial construction and is designed to give out a coded signal consisting of a constant frequency signal transmitted for a period of one second and turned off for a period of two seconds. The coded signal generated by the transmitter is fed to the whip antenna 21 which radiates electromagnetic waves in all directions. These electromagnetic waves are detected by suitable direction finding equipment (not shown) of a ship or vessel so that the diving assembly may be retrieved from the ocean. The transmitter housing 22, the transmitter off-on switch 23 and the whip antenna mounting 24 are all designed to withstand pressures up to 20,000 p.s.i. The 20,000 p.s.i. is the maximum pressure which has been found in any of the oceans of the world. Float 26 is of generally cylindrical shape and is constructed of reinforced rubber such as is found in tire carcasses. Attached to each end of the float are a pair of sealing and mounting plates 27. These plates 27 are of circular construction and are mounted in pairs with the rubber of the float sandwiched in between the pair of plates. The rubber of the float 26 is maintained between the two plates by the bolts 31. Within the float 26 a steel cable 29 connects the two plates on either end of the float. The cable is placed within the float so that the entire weight of the assembly is supported by the steel cable being lifted by D- ring 28. The transmitter housing 22 is mounted on one of the sealing and mounting plates 27. Float 26 is filled with a liquid such as gasoline, oil or any other suitable floating means with a requirement for the liquid within the float being that its density be less than that of sea water. A buoyant liquid is used within the float because of the physical property that liquids generally are not compressible and thus the float will be able to withstand 20,000 p.s.i. pressures without being crushed. One of the plates on each end of the float has a hole drilled into it. The purpose of this hole is to allow the sea water to enter the void between the two plates thus prohibiting the crushing of the plates due to the pressure of the sea water. The sealing and mounting plate 27 on the lower portion of float 26 has a collar 38 for attaching a D-ring 33. The D-ring 33 passes through this collar which allows free movement along one axis perpendicular to the axial direction of the float 26. Attached to the D-ring 33 is a cable connector 34 which is of the U-bolt type construction. This allows rotation about a second axis parallel with the surface of the water. Attached to the cable connector 34 in a well known manner is the connecting cable 36. The other end of the connecting cable 36 is connected to an O-ring 37. This O-ring 37 has three additional connecting cables 36 supporting the instrument container 39. The instrument container 39 is shown for illustration purposes only, as a sphere. Instrument container 39 can also be of the closed cylindrical construction, however, a sphere was utilized since the maximum volume for a given amount of steel is obtainable due to the fact that wall thickness of the container is the least in a sphere. With less steel and more buoyant force due to increased volume the payload can be increased for a given buoyant force. The instrument container is designed to be water tight up to a pressure of 20,000 p.s.i. It is constructed of stainless steel and is made in two parts. The two parts are essentially two half spheres joined together by bolts 41 which pass through the flanges 46. The sphere is supported by three connecting cables 36 which are connected to the sphere through suitable cable connectors 44. Cable connectors 44 are of the U-bolt type construction which are connected to the cables 36 and on the other end are connected to the sphere supports 42. The sphere supports 42 are mounted on the flanges 46 and support the weight of the instrument container 39. Attached to the lower portion of the instrument container 39 is a power and wire connector housing 43. The housing 43 attached to the upper portion of the sphere is identical in construction to the lower housing 42 and contains transducers for obtaining temperature and pressure data from the ocean. The sphere 39 is hollow on the inside and contains galvanometer and tape recorders and the power supply for all the instruments. The galvanometer recorder and the tape recorder together with the batteries used as a power supply are of standard commercial construction. Connecting the instrument container 39 to the antenna and amplifier housing 47, shown in FIG. 1B, are a series of three connecting cables 36, an O-ring 37 and one further connecting cable 36. These are the same construction as described before.

FIG. 1B is a view of the remaining components of the diving assembly. The power and wire connecting housing 43 is also connected to the antenna and amplifier housing by means of wire 48. This wire 48 is used to transfer the data from the antenna to the recorders positioned inside of the sphere. Connected to the antenna amplifier housing 47 is the loop antenna generally shown at 49. The loop antenna consists of three loops 51, 52, and 53. The three loops lie in planes mutually perpendicular to each other. The loops are mutually perpendicular to each other in order that they may receive a signal from any direction. The loops are constructed of rubber covered wire so that they form a single turn antenna and are covered with resin bonded glass. The resin bonded glass covering is non-magnetic as well as adding strength and rigidity to the loop antenna. Details of the loop antenna will be described more fully later. The antenna lead in wire 56 connects loop 52 with the antenna and amplifier housing 47. Passing down through the center of the loop is an axial Fiberglas connector rod 54. This rod is connected to the antenna and amplifier housing 47 and also connected to the Fiberglas D-ring connector 57. The purpose of this Fiberglas connector 54 is to carry the axial tension of the device and thus put no strain on the antenna loops themselves. The axial Fiberglas connector 54 is of hollow tubular construction and will be described more fully later in conjunction with FIG. 7. The Fiberglas D-ring connector 57 is connected to the time release mechanism 58 by means of cable 36. The time release mechanism 58 is placed between the anchor 59 and the antenna 49. The purpose of a time release mechanism is to release or separate the anchor 59 from the remaining assembly at a predetermined time. The time release mechanism 58 is activated or controlled by a clock mechanism which is connected to a battery. After a predetermined time, the battery fires an explosive and ruptures a bolt within the time release mechanism thus releasing the anchor 59 from the remaining assembly. The release of the anchor allows the other remaining assembly to float to the surface of the water due to the buoyancy of the float 26, FIG. 1a. Two time release mechanisms 58 are employed in series connected by a cable 36 to insure that at least one will release the mechanism. Since the whole test would be frustrated without the release of the mechanism two release mechanisms were employed as a safety factor to insure that the assembly would rise to the surface of the water. Connecting the second or lower release mechanism 58 to the anchor 59 is a coil spring 61, whose purpose is to absorb the shock due to the sudden changes in the anchor. The anchor is connected to the coil spring by suitable cable connector 34 attached to a D-ring 28 which is embedded in the concrete anchor 59. Attached to the concrete anchor 59 are a plurality of fins 62 attached by bolts 63. The purpose of the fins is to maintain stability as the assembly descends from the surface to the bottom of the ocean.

FIG. 2 is a schematic diagram of the typical amplifier and cathode follower circuitry used in converting the signal received by the antenna to a signal which is capable of being recorded by the galvanometer recorder and a tape recorder. The signal is detected by the antenna, shown as the block designated ANTENNA. The signal is then stepped up in a transformer TR which is a 1:1,500 step-up transformer. The output of the transformer is connected to the first stage amplifier tube $T_1$ which may be one-half of a 6072 dual triode amplifier tube. The output of the transformer TR is connected to the grid of the tube $T_1$ which amplifies the signal. The output of tube $T_1$ taken from the plate is capacitively connected through capacitor $C_1$ to the grid of tube $T_2$ which is the second half of 6072 dual triode amplifier. The signal is here amplified again and is capacitively coupled through capacitor $C_2$ to a third stage of the amplifier $T_3$. $T_3$ may be one-half of a 5051 dual triode amplifier tube. The signal is then amplified in tube $T_3$ and the output is taken off the plate and capacitively coupled by capacitor $C_3$ to the grid of tube $T_4$ which may be the second half of 5751 dual triode amplifier tube. The signal is amplified in the tube $T_4$ and the output is taken from the junction between resistors $R_4$ and $R_5$. This output is the cathode follower output and is capacitively coupled through capacitor $C_4$ to both the galvanometer recorder and tape recorder. Capacitors $C_5$, $C_6$ and $C_7$ are A.C. by-pass capacitors between the cathode and ground. Resistors $R_1$, $R_2$ and $R_3$ are bias resistors to produce the proper bias on the cathodes of the respective tubes. Resistors $R_4$ and $R_5$ form a voltage dividing network in order that a low voltage cathode follower output may be obtained. Resistors $R_6$, $R_7$ and $R_8$ are bias resistors for the respective grids of the tubes to which they are connected. Resistors $R_9$, $R_{10}$, and $R_{11}$ are load resistors for the various tubes to which they are connected. Capacitor $C_8$ is a high frequency bypass capacitor between the plate and the cathode of tube $T_1$. The filter network resistor comprises resistors $R_{12}$, $R_{13}$, and capacitors $C_9$ and $C_{10}$ which maintain a more nearly constant plate voltage for tubes $T_1$ and $T_2$. The amplifier and cathode follower of FIG. 2 operate in a well known manner and the various values of the resistors and capacitors which may be utilized to make an operative embodiment are given in Table I.

TABLE I

Resistance in ohms:

| | |
|---|---|
| $R_1$, 2.7K | $R_8$, 470K |
| $R_2$, 2.7K | $R_9$, 20K |
| $R_3$, 5.6K | $R_{10}$, 20K |
| $R_4$, 1.8K | $R_{11}$, 470K |
| $R_5$, 100K | $R_{12}$, 8.2K |
| $R_6$, 100K | $R_{13}$, 8.2K |
| $R_7$, 270K | |

Capacitance in microfarads:

| | |
|---|---|
| $C_1$, 4 | $C_6$, 200 |
| $C_2$, 4 | $C_7$, 200 |
| $C_3$, 1 | $C_8$, 47 |
| $C_4$, 4 | $C_9$, 30 |
| $C_5$, 200 | $C_{10}$, 30 |

The operation of the automatic instrumented diving assembly will now be described. The assembly is so constructed so as to accommodate itself both to the conditions present at sea level on board a ship as well as those present in the deep sea up to the depth of seven miles which is the deepest portion of the sea that is known today. The metal portions of the assembly which are exposed to sea water have been constructed of stainless steel due to the characteristics of having both high tensile strength as well as resistivity to the elements present both in the atmosphere and in the sea. The float is made preferably of a flexible rubber construction or any of the synthetic varieties thereof suitable for the purpose in order that it may accommodate both temperature and pressure changes. Since the float 26, FIG. 1A, is filled with gasoline which expands greatly in the presence of sunlight, the float must be able to accommodate this expansion and still be safe on board ship. While in the sea water the float must be able to withstand the great pressures present in the sea up to 20,000 pounds per square inch. Flexible rubber construction allows the float to absorb the shock while on board ship and when submerged in water it is able to be compressed a small amount due to the pressure of the sea water. The sphere 39, FIG. 1A, must also be able to absorb this shock present on the ship as well as withstanding the pressures of the sea. The loop antenna 49, FIG. 1B, presented a special problem in that it had to be rigid as well as being sensitive to very minute electromagnetic radiations present in the deep sea. The loop antenna was designed as a pressure resistive magnetic loop detector for electromagnetic noise background detection within a range of 20 to 1,000 cycles per second at a very low intensity. The antenna is constructed of a 10-foot diameter single turn loop made preferably of insulated number 6 stranded wire. This wire is wrapped with a glass cloth epoxy resin which is thereafter cured and gives the loop antenna the rigidity that is required as well as being pressure resistant. The glass epoxy resin produces two results; one, giving the necessary strength to the loop wire and secondly provides an installation which is required over the loop antenna. In the antenna conductors there are present eddy currents which seriously hinder the detection of a very low intensity noise background which is the purpose to determine. The glass epoxy resin respectively insulates the antenna from the sea water, which is a good conductor, and the eddy currents which are present are reduced due to the thick insulation surrounding the antenna conductors. The presence of three loop antennae which are mutually perpendicular to each other in different planes gives an omni-directional antenna which is capable of detecting radiation in any direction. These very small electromagnetic radiations detected by the loop antennae are fed into a step-up transformer whose ratio is 1/1,500 and from then it is amplified in two stages of a dual triode amplifier. The dual triode amplifier is fed into a second dual triode amplifier for further amplification and the output is taken from the cathode follower of the second half of the second dual triode amplifier. This output is utilized by the recordings both on the galvanometer recorder and the tape recorder. The galvanometer recorder is also utilized to make a continuous recording of the temperature and pressure as the instrument descends, while it remains at the bottom, and while it ascends to the surface.

The sequence of events on a typical dive will now be described. As the assembly starts to submerge water covers the sensitive switch on the transmitter 23 and turns the transmitter off. As the assembly is submerged a constant record is kept by the galvanometer recorder of the temperature and pressures present in the ocean within the immediate vicinity of the device. The assembly descends to the bottom of the ocean and the spring 61 absorbs the energy of the float on the rebound of the overshoot as the float attempts to resurface. While at the bottom of the ocean the tape recorder and the galvanometer together record the outputs from the temperature and pressure responsive instruments as well as any other recordings which may be desired during the entire stay at the bottom of the ocean. After the predetermined time has occurred a clock in the explosive release mechanism 58 will cause the bolts to explode and release the assembly from the anchor. At this time due to the positive buoyancy of the float the assembly will rise to the surface of the water. The instruments during this entire time are continually recording the physical phenomena encountered in the ocean. Upon surfacing, the sea water sensitive switch 23 will become an open circuit and a relay controlled thereby will actuate the transmitter to start transmitting the coded signal which may consist of a constant frequency on for one second and off for two. The effective range of the transmitter is approximately 100 miles. Suitable direction finding equipment placed on a vessel can pick up the signal transmitted by the transmitter and the assembly can be found.

Various modifications are contemplated and may obviously be resorted to by those skilled in the art without departing from the spirit and scope of the invention, as hereinafter defined by the appended claims, as any preferred embodiment thereof has been disclosed.

What is claimed is:

1. An unmanned instrumented deep sea diving assembly for determining the characteristics of electromagnetic radiation present at the bottom of the ocean comprising means for submerging the assembly, means for surfacing the assembly after a predetermined time, an antenna connected to the submerging and surfacing means for detecting the electromagnetic radiations having three concentric loops mutually perpendicular, each loop comprising a single turn of conductive material, an epoxy resin bonded glass cloth completely covering the conductive material and insulating the conductive material from the sea, whereby the combination of conductive material and said glass cloth produces a rigid body which reduces the eddy currents in the conductor and is able to withstand both high sea water pressure and the force of the water currents tending to deform the loop and recording means connected to the antenna for making a permanent record of the radiations detected by the antenna.

2. In an assembly as recited in claim 1 wherein the recording means comprises a magnetic tape recorder for recording low frequency electromagnetic radiations and a galvanometer recorder for making a permanent time base record of the amplitude of the detected radiations.

References Cited by the Examiner

UNITED STATES PATENTS

| | | | |
|---|---|---|---|
| 2,009,087 | 7/1935 | Kennedy et al. | 343—842 |
| 2,049,588 | 8/1936 | Leib | 343—709 |
| 2,722,019 | 11/1955 | Brock | 9—8.3 |
| 3,009,525 | 11/1961 | De Liban | 340—4 X |

OTHER REFERENCES

English et al.: Marine Sciences Instrumentation, vol. I, Plenum Press, New York, N.Y., published May 16, 1962 (pp. 321, 323, 325, 327, 329–331, and 333 relied on).

CHESTER L. JUSTUS, *Primary Examiner.*

R. A. FARLEY, *Assistant Examiner.*